(12) United States Patent
Takeda et al.

(10) Patent No.: US 11,382,044 B2
(45) Date of Patent: Jul. 5, 2022

(54) DETERMINING A TRANSMIT POWER OF UPLINK TRANSMISSIONS

(71) Applicant: QUALCOMM Incorporated, San Diego, CA (US)

(72) Inventors: Kazuki Takeda, Tokyo (JP); Wanshi Chen, San Diego, CA (US); Peter Gaal, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/092,675

(22) Filed: Nov. 9, 2020

(65) Prior Publication Data
US 2021/0235385 A1 Jul. 29, 2021

Related U.S. Application Data

(60) Provisional application No. 62/964,869, filed on Jan. 23, 2020.

(51) Int. Cl.
*H04W 52/14* (2009.01)
*H04W 52/42* (2009.01)

(52) U.S. Cl.
CPC ......... *H04W 52/146* (2013.01); *H04W 52/42* (2013.01)

(58) Field of Classification Search
CPC ............. H04W 52/281; H04W 52/346; H04W 52/146; H04W 52/42

USPC ............................ 455/522, 69, 452.1, 67.11
See application file for complete search history.

(56) References Cited

U.S. PATENT DOCUMENTS

| 2017/0150452 A1* | 5/2017 | Rosa ................... H04W 52/226 |
| 2017/0202025 A1* | 7/2017 | Ouchi ................. H04W 52/346 |

OTHER PUBLICATIONS

Apple Inc: Feature lead summary #4 for uplink power control for NR-NR DC, 3GPP Draft; R1-1913573, 3rd Generation Partnership Project (3GPP), vol. RAN WG1, No. Reno, USA; Nov. 18, 2019-Nov. 22, 2019 Nov. 25, 2019 (Nov. 25, 2019), XP051830850 (Year: 2019).*

(Continued)

*Primary Examiner* — John J Lee
(74) *Attorney, Agent, or Firm* — The Marbury Law Group/Qualcomm

(57) ABSTRACT

This disclosure provides systems, methods, apparatus, and computer programs encoded on a computer storage media for determining a transmit power of an uplink transmission to one or more serving cells in a secondary cell group (SCG). In one aspect, a wireless device may determine a deadline prior to the uplink transmission to the one or more serving cells in the secondary cell group. The wireless device may determine whether to perform a semi-static uplink transmission that is not scheduled by a DCI format to a serving cell in a master cell group. The wireless device may and adjust a transmit power of the uplink transmission to the one or more serving cells in the secondary cell group in response to determining to perform the semi-static uplink transmission to the serving cell in the master cell group.

22 Claims, 10 Drawing Sheets

(56) References Cited

OTHER PUBLICATIONS

Apple Inc: "Feature Lead Summary #4 for Uplink Power Control for NR-NR DC," 3GPP Draft, 3GPP TSG-RAN WG1 #99, R1-1913573, 3rd Generation Partnership Project (3GPP), Mobile Competence Centre, Sophia-Antipolis Cedex, France, vol. RAN WG1, No. Reno, USA, Nov. 18, 2019-Nov. 22, 2019, Nov. 25, 2019, XP051830850, pp. 1-14, Retrieved from the Internet: URL: https://ftp.3gpp.org/tsg_ran/WG1_RL1/TSGR1_99/Docs/R1-1913573.zip R1-1913573.docx [retrieved on Nov. 25, 2019] p. 7, line 4-p. 8, last paragraph.
Intel Corporation: "Uplink Power Control for NR-NR Dual Connectivity", 3GPP Draft, 3GPP TSG-RAN WG1 #98, R1-1908664, PC_MR-DC, 3rd Generation Partnership Project (3GPP), Mobile Competence Centre, Sophia-Antipolis Cedex, France, vol. RAN WG1, No. Prague, CZ, Aug. 26, 2019-Aug. 30, 2019, Aug. 17, 2019, XP051765272, pp. 1-8, Retrieved from the Internet: URL: http://www.3gpp.org/ftp/tsg_ran/WG1_RL1/TSGR1_98/Docs/R1-1908664.zip.
International Search Report and Written Opinion—PCT/US2020/062603—ISA/EPO—dated Mar. 5, 2021. 16 pages.
Samsung: "Uplink Power Control for NN-DC", 3GPP Draft, R1-1912495, 3GPP TSG RAN WG1 #99, 3rd Generation Partnership Project (3GPP), Mobile Competence Centre, Sophia-Antipolis Cedex, France, vol. RAN WG1, No. Reno, USA, Nov. 18, 2019-Nov. 22, 2019, Nov. 9, 2019, XP051823438, 3 pages, Retrieved from the Internet: URL: https://ftp.3gpp.org/tsg_ran/WG1_RL1/TSGR1_99/Docs/R1-1912495.zip R1-1912495 DC PC.docx.
3GPP TS 38.213: "3rd Generation Partnership Project; Technical Specification Group Radio Access Network; NR; Physical Layer Procedures for Control (Release 16)", 3GPP TS 38.213, V16.7.0, Sep. 2021, 9 pages, Section 7.6.2; 11.1.
3GPP TS 38.214: "3rd Generation Partnership Project; Technical Specification Group Radio Access Network; NR; Physical Layer Procedures for Data (Release 16)", 3GPP TS 38.214, V16.7.0, Sep. 2021, pp. 108-110, Section 6.1.

* cited by examiner

DETERMINING A TRANSMIT POWER OF UPLINK TRANSMISSIONS

RELATED APPLICATIONS

This application claims the benefit of priority to U.S. Provisional Application No. 62/964,869 entitled "DETERMINING A TRANSMIT POWER OF UPLINK TRANSMISSIONS" filed Jan. 23, 2020, the entire contents of which are incorporated herein by reference for all purposes.

TECHNICAL FIELD

This disclosure relates generally to wireless devices, and more particularly to managing transmit power of wireless devices.

DESCRIPTION OF RELATED TECHNOLOGY

Wireless devices may communicate with more than one base station or cell at a time, such as a primary base station and a secondary base station. Each base station or cell coordinates individually with each wireless device to determine the transmit power to be used for uplink transmissions to a cell or cell group. Government regulations dictate a maximum transmit power to which a device user can be exposed. The maximum transmit power limit is normally not a limitation for wireless devices communicating with more than one base station or cell, provided uplink transmissions do not occur at the same time. Communication protocols have been established for simultaneous transmissions of scheduled uplink transmissions. However, there are some uplink transmissions by wireless devices that are not scheduled by the base station, and thus present the potential for a wireless device to attempt uplink transmissions to two cell groups simultaneously, which could exceed the maximum permissible transmit power unless the wireless device reduces transmit power used for one of the uplink transmissions.

SUMMARY

The systems, methods and devices of this disclosure each have several innovative aspects, no single one of which is solely responsible for the desirable attributes disclosed herein.

One innovative aspect of the subject matter described in this disclosure may be implemented in a wireless device for determining a transmit power of an uplink transmission to one or more serving cells in a secondary cell group (SCG). The various implementations include methods performed by an apparatus of a wireless device that may include determining a deadline prior to the uplink transmission to the one or more serving cells in the SCG, determining whether to perform a semi-static uplink transmission that is not scheduled by a downlink control information (DCI) format to a serving cell in a master cell group (MCG), and adjusting a transmit power of the uplink transmission to the one or more serving cells in the SCG in response to determining to perform the semi-static uplink transmission to the serving cell in the master cell group.

Some implementations may include transmitting the uplink transmission to the one or more serving cells in the SCG using an unadjusted transmit power in response to determining to not perform the semi-static uplink transmission to the serving cell in the MCG. Some implementations may include transmitting the uplink transmission to the one or more serving cells in the SCG using the adjusted transmit power. In some implementations, determining the deadline prior to the uplink transmission to the one or more serving cells in the SCG is performed in response to receiving a DCI format for the one or more serving cells in the SCG scheduling the uplink transmission to the one or more serving cells in the SCG and based on a scheduled start of the uplink transmission to the one or more serving cells in the SCG minus an offset period.

Some implementations may include determining the offset period. In some implementations, the offset period may be determined based on one or more capabilities of the wireless device. Some implementations may include determining whether the wireless device is permitted to skip the semi-static uplink transmission to the serving cell in the MCG according to a wireless device parameter received from a base station.

In some implementations, adjusting the transmit power of the uplink transmission to the one or more serving cells in the SCG may include reducing the transmit power of the uplink transmission to the one or more serving cells in the SCG such that a combined transmit power of the semi-static uplink transmission to the serving cell in the MCG and the uplink transmission to the one or more serving cells in the SCG is less than or equal to a maximum permitted transmit power of the wireless device.

Another innovative aspect of the subject matter described in this disclosure can be implemented in an apparatus of a wireless device. Some implementations may include a wireless transceiver and a processing system coupled to the wireless transceiver and configured to determine a deadline prior to an uplink transmission to one or more serving cells in a SCG, determine whether to perform a semi-static uplink transmission that is not scheduled by a DCI format to a serving cell in an MCG, and adjust a transmit power of the uplink transmission to the one or more serving cells in the SCG in response to determining to perform the semi-static uplink transmission to the serving cell in the MCG.

In some implementations, the processing system may be configured to transmit the uplink transmission to the one or more serving cells in the SCG using an unadjusted transmit power in response to determining to not perform the semi-static uplink transmission to the serving cell in the MCG. In some implementations, the processing system may be configured to transmit the uplink transmission to the one or more serving cells in the SCG using the adjusted transmit power.

In some implementations, the processing system may be configured to determine the deadline prior to the uplink transmission to the one or more serving cells in the SCG in response to receiving a DCI format for the one or more serving cells in the SCG scheduling the uplink transmission to the one or more serving cells in the SCG and based on a scheduled start of the uplink transmission to the one or more serving cells in the SCG minus an offset period. In some implementations, the processing system may be configured to determine the offset period. In some implementations, the processing system may determine the offset period based on one or more capabilities of the wireless device.

In some implementations, the processing system may be configured to determine whether the wireless device is permitted to skip the semi-static uplink transmission to the serving cell in the MCG according to a wireless device parameter received from a base station. In some implementations, the processing system may be configured to adjust the transmit power of the uplink transmission to the one or more serving cells in the SCG by reducing the transmit power of the uplink transmission to the one or more serving cells in the SCG such that a combined transmit power of the semi-static uplink transmission to the serving cell in the MCG and the uplink transmission to the one or more serving cells in the SCG is less than or equal to a maximum permitted transmit power of the wireless device.

Another innovative aspect of the subject matter described in this disclosure can be implemented in a non-transitory processor-readable medium having stored thereon processor-executable instructions configured to cause a processing system of a wireless device to perform operations of various implementations. In some implementations, the stored processor-executable instructions may be configured to cause a processing system of a wireless device to perform operations including determining a deadline prior to an uplink transmission to one or more serving cells in a SCG, determining whether to perform a semi-static uplink transmission that is not scheduled by a DCI format to a serving cell in an MCG, and adjusting a transmit power of the uplink transmission to the one or more serving cells in the SCG in response to determining to perform the semi-static uplink transmission to the serving cell in the MCG.

In some implementations, the stored processor-executable instructions may be configured to cause a processing system of a wireless device to perform operations further including transmitting the uplink transmission to the one or more serving cells in the SCG using an unadjusted transmit power in response to determining to not perform the semi-static uplink transmission to the serving cell in the MCG. In some implementations, the stored processor-executable instructions may be configured to cause a processing system of a wireless device to perform operations further including transmitting the uplink transmission to the one or more serving cells in the SCG using the adjusted transmit power.

In some implementations, the stored processor-executable instructions may be configured to cause a processing system of a wireless device to perform operations such that determining the deadline prior to the uplink transmission to the one or more serving cells in the SCG is performed in response to receiving a DCI format for the one or more serving cells in the SCG scheduling the uplink transmission to the one or more serving cells in the SCG and based on a scheduled start of the uplink transmission to the one or more serving cells in the SCG minus an offset period. In some implementations, the stored processor-executable instructions may be configured to cause a processing system of a wireless device to perform operations further including determining the offset period. In some implementations, the stored processor-executable instructions may be configured to cause a processing system of a wireless device to perform operations further including determining the offset period based on one or more capabilities of the wireless device.

In some implementations, the stored processor-executable instructions may be configured to cause a processing system of a wireless device to perform operations further including determining whether the wireless device is permitted to skip the semi-static uplink transmission to the serving cell in the MCG according to a wireless device parameter received from a base station.

In some implementations, the stored processor-executable instructions may be configured to cause a processing system of a wireless device to perform operations such that adjusting the transmit power of the uplink transmission to the one or more serving cells in the SCG includes reducing the transmit power of the uplink transmission to the one or more serving cells in the SCG such that a combined transmit power of the semi-static uplink transmission to the serving cell in the MCG and the uplink transmission to the one or more serving cells in the SCG is less than or equal to a maximum permitted transmit power of the wireless device.

Another innovative aspect of the subject matter described in this disclosure can be implemented in a wireless device having means for performing functions of various implementation methods. Some implementations may include a wireless having means for determining a deadline prior to an uplink transmission to one or more serving cells in a SCG, means for determining whether to perform a semi-static uplink transmission that is not scheduled by a DCI format to a serving cell in an MCG, and means for adjusting a transmit power of the uplink transmission to the one or more serving cells in the SCG in response to determining to perform the semi-static uplink transmission to the serving cell in the MCG.

Some implementations may further include means for transmitting the uplink transmission to the one or more serving cells in the SCG using an unadjusted transmit power in response to determining to not perform the semi-static uplink transmission to the serving cell in the MCG. Some implementations may further include means for transmitting the uplink transmission to the one or more serving cells in the SCG using the adjusted transmit power.

In some implementations, means for determining the deadline prior to the uplink transmission to the one or more serving cells in the SCG may include means for determining the deadline prior to the uplink transmission to the one or more serving cells in the SCG in response to receiving a DCI format for the one or more serving cells in the SCG scheduling the uplink transmission to the one or more serving cells in the SCG and based on a scheduled start of the uplink transmission to the one or more serving cells in the SCG minus an offset period. Some implementations may further include means for determining the offset period. Some implementations may further include means for determining the offset period based on one or more capabilities of the wireless device.

Some implementations may further include means for determining whether the wireless device is permitted to skip the semi-static uplink transmission to the serving cell in the MCG according to a wireless device parameter received from a base station.

In some implementations, means for adjusting the transmit power of the uplink transmission to the one or more serving cells in the SCG may include means for reducing the transmit power of the uplink transmission to the one or more serving cells in the SCG such that a combined transmit power of the semi-static uplink transmission to the serving cell in the MCG and the uplink transmission to the one or more serving cells in the SCG is less than or equal to a maximum permitted transmit power of the wireless device.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
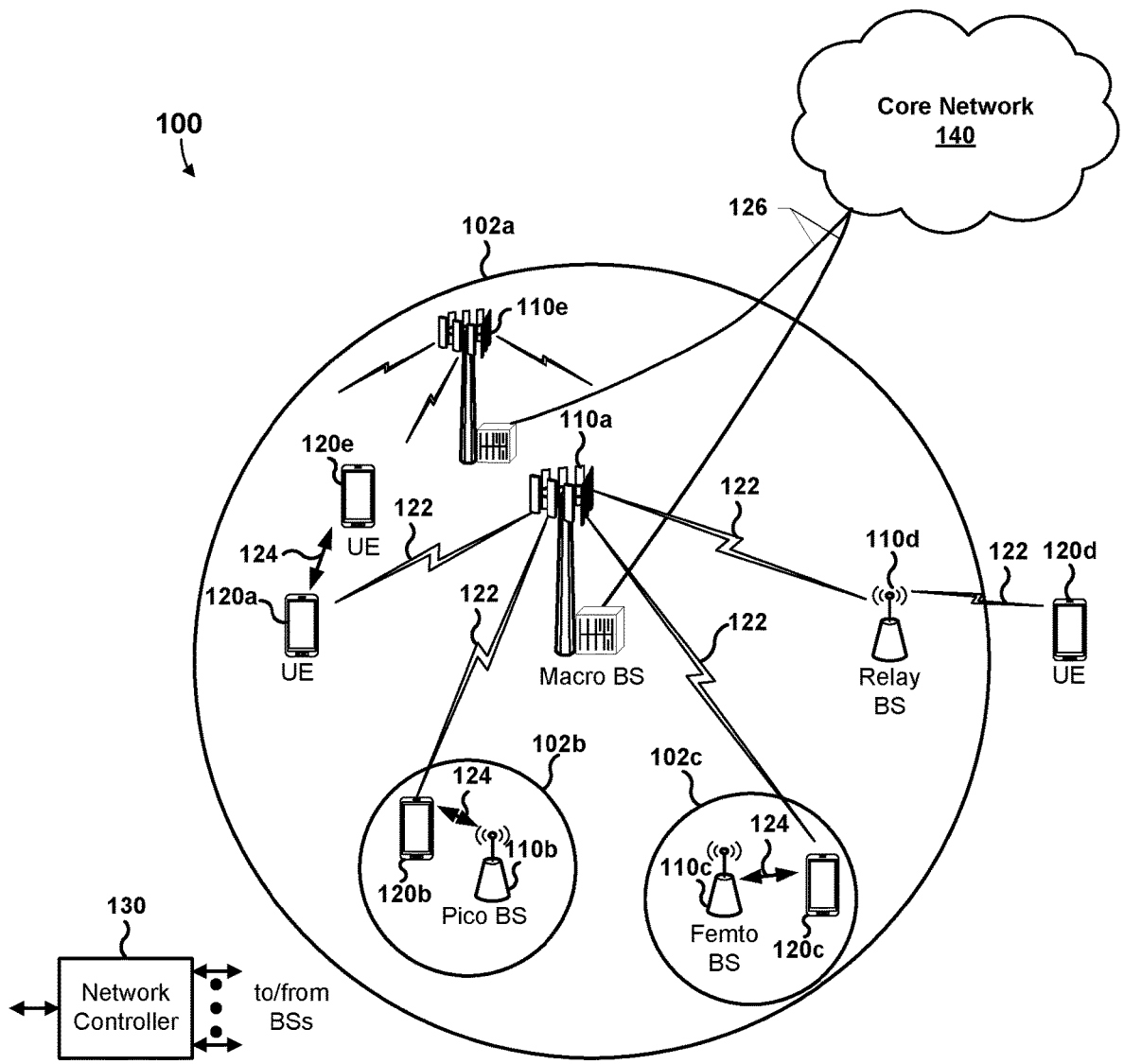
FIG. 1 shows a system block diagram illustrating an example communications system.

The following description is directed to certain implementations for the purposes of describing the innovative aspects of this disclosure. However, a person having ordinary skill in the art will readily recognize that the teachings herein may be applied in a multitude of different ways.

The described implementations may be implemented in any device, system, or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other signals that are used to communicate within a wireless, cellular or Internet of Things (IoT) network, such as a system utilizing 3G, 4G, or 5G technology, or further implementations thereof.

Wireless devices may be configured to dynamically share or scale the transmit power of uplink transmissions to cells or cell groups. When transmissions to two or more cell groups overlap in time, the wireless device reduces the transmit power of transmissions to cells to remain within a total transmit power limit.

In New Radio-Dual Connectivity (NR-DC) power sharing, transmissions to a master cell group (MCG) may be prioritized over transmissions to a secondary cell group (SCG). If transmissions to the MCG and SCG overlap in time, a wireless device may reduce the transmit power to the SCG. To provide sufficient time to adjust the SCG transmit power, the wireless device may determine a deadline by which overlapping transmissions must be detected. For example, a downlink control information (DCI) format (or another suitable physical downlink control channel (PDCCH) message) may schedule an uplink transmission (such as in a physical uplink shared channel (PUSCH)) to an SCG at a time T0. Using an offset time (such as T_offset) the wireless device may determine a deadline of T0−T_offset. If the wireless device receives a DCI format before the deadline that schedules an uplink transmission to the MCG that overlaps in time with a scheduled SCG uplink transmission, the wireless device will reduce the transmit power of the SCG uplink transmission. If the wireless device receives a DCI format after the deadline that schedules an uplink transmission to the MCG that overlaps in time a scheduled SCG uplink transmission, the wireless device may not reduce the SCG uplink transmit power. This is because the specification provided by the relevant communication protocol (such as the 5G NR protocol) ensures that a wireless device will not receive a DCI format from the network after the deadline scheduling an MCG uplink transmission that will overlap in time with a scheduled SCG uplink transmission.

However, certain MCG uplink transmissions are not scheduled by a DCI format. For example, for configured grant (CG) uplink transmissions and other similar uplink transmissions, the wireless device is not required to transmit a scheduling request and receive an uplink resource grant from a cell. In some implementations, the wireless device may be configured to independently determine whether or not to send a CG PUSCH uplink transmission (for example, by a MAC parameter such as skipUplinkTxDynamic). In some cases, the wireless device may determine whether to send a CG PUSCH uplink transmission after the T0−T_offset deadline. As another example, certain periodic or semi-persistent uplink transmissions, such as a periodic or semi-persistent channel state indicator (CSI), or a periodic (P) or semi-persistent (SP) sounding reference signal (SRS), may be canceled by a slot format indication (SFI) that indicates a downlink slot or a flexible slot that overlaps in time with a scheduled SCG uplink transmission.

Various implementations enable a wireless device to determine a transmit power of an uplink transmission to one or more serving cells in a SCG. A wireless device apparatus (such as a processing system) may determine a deadline prior to the uplink transmission to the one or more serving cells in the SCG. For example, the wireless device apparatus may determine the deadline based on the scheduled beginning of an uplink transmission to the one or more serving cells in the SCG, minus an offset time period. In some implementations, the deadline may be represented as T0−T_offset, where T0 represents the scheduled beginning of an uplink transmission to one or more second cell group serving cells, and T_offset represents a duration of time prior to T0. In some implementations, the wireless device apparatus may determine the deadline in response to receiving a DCI format for the one or more serving cells in the SCG scheduling the uplink transmission to the one or more serving cells in the SCG. In some implementations, the wireless device apparatus may determine the offset period based on one or more capabilities of the wireless device.

For example, a wireless device processing system configured with fast processing resources may require less time to determine an adjusted secondary cell transmit power, and may determine a relatively shorter offset period based on the capabilities of the wireless device.

As another example, a wireless device processing system configured with a fast timeline may require less time to determine an adjusted secondary cell transmit power, and may determine a relatively shorter offset period based on the capabilities of the wireless device.

In some implementations, a wireless device may be configured with a timeline to process a transmission. If the transmission is triggered (or canceled) with sufficient timeline for the process, the wireless device may send the transmission (or cancel). However, if the trigger to send (or the cancellation) occurs without ensuring the timeline, the wireless device may not be able to send the transmission (or cancel). A timeline (for example, such as may be specified in European Telecommunications Standards Institute (ETSI) Technical Specification (TS) 38.214) may be determined based at least in part on one or more capabilities of the wireless device (for example, the parameter N2 specified in ETSI TS 38.214, which depends on wireless device capability "capability 2" and configuration "processingType2Enabled".) In some implementations, N2 may be based on one or more factors of wireless device processing capability.

In some implementations, the wireless device apparatus (such as a processing system) may determine whether to perform a semi-static uplink transmission that is not scheduled by a downlink control information (DCI) format to a serving cell in an MCG. For example, for CG transmissions and other similar uplink transmissions, the wireless device is not required to transmit a scheduling request and receive an uplink resource grant from a cell. In some implementations, the wireless device apparatus may determine whether to skip the CG transmission (or other similar transmission). As another example, certain periodic or semi-persistent uplink transmissions, such as a periodic or semi-persistent channel state indicator (CSI), or a periodic or semi-persistent sounding reference signal (SRS), may be canceled by an SFI. In some implementations, the wireless device apparatus may determine that a P-CSI, SP-CSI, P-SRS, SP-SRS, or the like, has been canceled by an SFI. In some implementations, the wireless device apparatus may determine whether the wireless device is permitted to skip the semi-static uplink transmission to the serving cell in the MCG according to a wireless device parameter received from a base station (for example, a MAC parameter such as skipUplinkTxDynamic).

In some implementations, the wireless device apparatus (such as a processing system) may adjust a transmit power of the uplink transmission to the one or more serving cells in the SCG in response to determining to perform the semi-static uplink transmission to the serving cell in the MCG. In some implementations, the wireless device may transmit the uplink transmission to the one or more serving cells in the SCG using the adjusted transmit power. In some implementations, the wireless device apparatus may determine to not perform the semi-static uplink transmission to the serving cell in the MCG, and in response may transmit the uplink transmission to the one or more serving cells in the SCG using an unadjusted (such as a previously determined or calculated) transmit power. In some implementations, the wireless device apparatus may reduce the transmit power of the one or more scheduled uplink transmissions to the one or more serving cells in the SCG. In some implementations, a combined transmit power of the semi-static uplink transmission to the serving cell in the MCG and the one or more scheduled uplink transmissions to the one or more serving cells in the SCG may be less than or equal to a maximum permitted transmit power of the wireless device.

Particular implementations of the subject matter described in this disclosure can be implemented to realize one or more of the following potential advantages. Various implementations enable a wireless device to adjust a transmit power of transmissions to a SCG responsive to MCG uplink transmissions that are not scheduled by a DCI format. Various implementations improve the safety and efficiency of wireless devices by dynamically adjusting the transmit power of uplink transmissions to comply with maximum transmit power requirements. Various implementations may enable efficient utilization of an available transmission power of a wireless device and enhance the uplink coverage.

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (such as smart rings, smart bracelets, etc.), entertainment devices (such as wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable apparatus (such as a processing system).

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

The term "multicore processor" may be used herein to refer to a single integrated circuit (IC) chip or chip package that contains two or more independent processing cores (such as CPU core, Internet protocol (IP) core, graphics processor unit (GPU) core, etc.) configured to read and execute program instructions. A SOC may include multiple multicore processors, and each processor in an SOC may be referred to as a core. The term "multiprocessor" may be used herein to refer to a system or device that includes two or more processing units configured to read and execute program instructions.

The term "processing system" is used herein to refer to a processor, an SOC, or an SIP coupled to or including a memory device.

FIG. 1 shows a system block diagram illustrating an example communications system 100. The communications system 100 may be a 5G NR network, or any other suitable network such as an LTE network.

The communications system 100 may include a heterogeneous network architecture that includes a core network 140 and a variety of mobile devices (illustrated as wireless device 120a-120e in FIG. 1). The communications system 100 also may include a number of base stations (illustrated as the BS 110a, the BS 110b, the BS 110c, and the BS 110d) and other network entities. A base station is an entity that communicates with wireless devices (mobile devices), and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base stations 110a may function as an MCG, while another base station 110e (or elements within the same base station) may function as an SCG. The wireless device 120a-120e may communicate with the MCG and SCG base stations 110a, 110e over wireless communication links 122.

A base station 110a-110e may provide communication coverage for a macro cell, a pico cell, a femto cell, another type of cell, or a combination thereof. A macro cell may cover a relatively large geographic area (for example, several kilometers in radius) and may allow unrestricted access by wireless devices with service subscription. A pico cell may cover a relatively small geographic area and may allow unrestricted access by wireless devices with service subscription. A femto cell may cover a relatively small geographic area (for example, a home) and may allow restricted access by wireless devices having association with the femto cell (for example, wireless devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110e may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110e may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110e functioning as an MCG and a base station 110e functioning as an SCG may communicate with the core network 140 over a wired or wireless communication link 126.

The wired communication link 126 may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (such as relay BS 110d). A relay station is an entity that can receive a transmission of data from an upstream station (for example, a base station or a wireless device) and send a transmission of the data to a downstream station (for example, a wireless device or a base station). A relay station also may be a wireless device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communications system 100, and each wireless device may be stationary or mobile. A wireless device also may be referred to as an access terminal, a terminal, a mobile station, a subscriber unit, a station, etc.

The wireless communication links 122, 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (such as LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some implementations may use terminology and examples associated with LTE technologies, various implementations may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 subcarriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some wireless devices may be considered machine-type communication (MTC) or evolved or enhanced machine-type communication (eMTC) wireless devices. MTC and eMTC wireless devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some wireless devices may be considered Internet-of-Things (IoT) devices or may be implemented as NB-IoT (narrowband Internet of things) devices. A wireless device 120a-e may be included inside a housing that houses components of the wireless device, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

Figure 2:
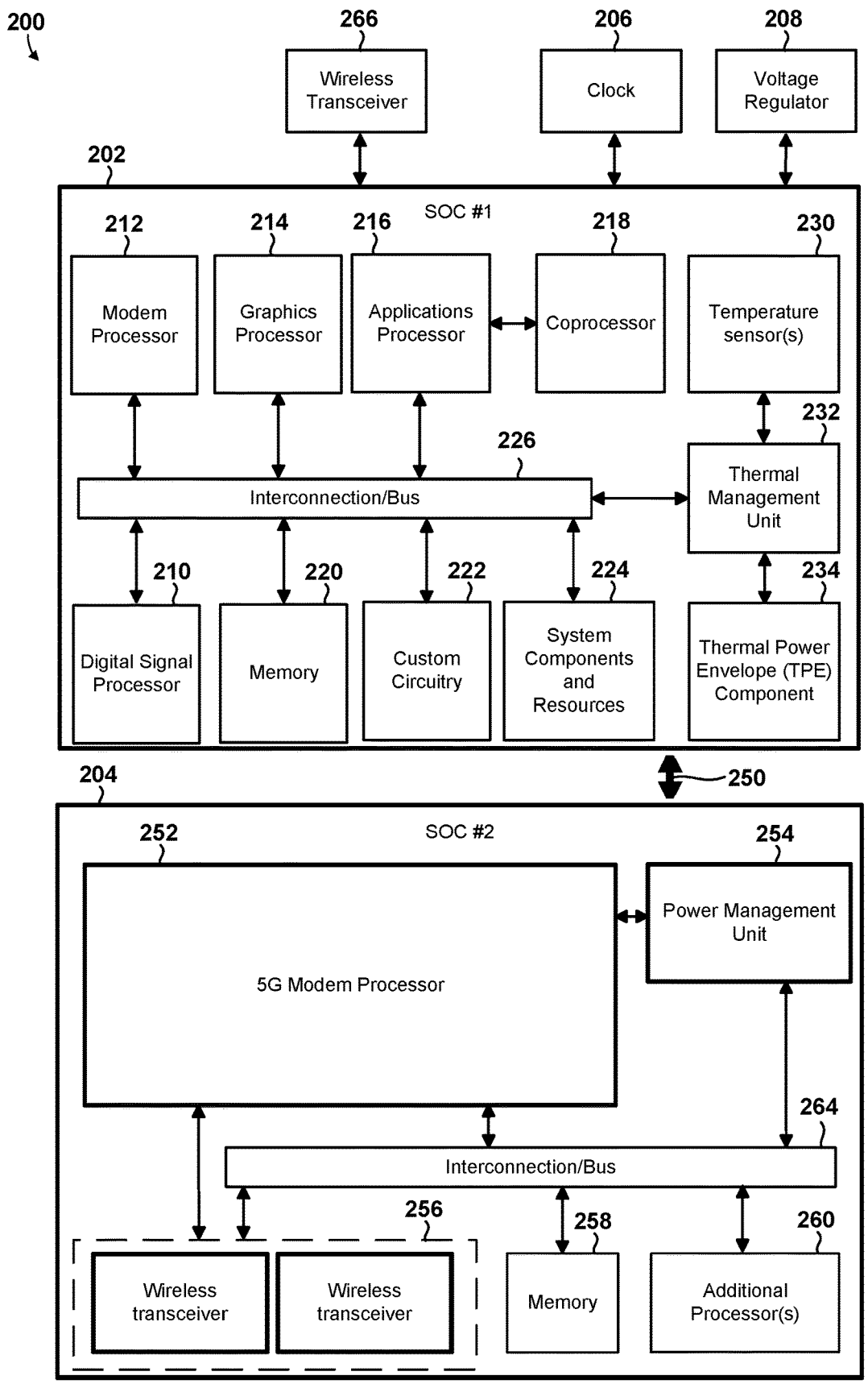
FIG. 2 shows a component block diagram illustrating an example processing system.

In some implementations, two or more mobile devices 120a-e (for example, illustrated as the wireless device 120a and the wireless device 120e) may communicate directly using one or more sidelink channels 124 (for example, without using a base station 110a-110e as an intermediary to communicate with one another). For example, the wireless devices 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-e may perform scheduling operations, resource selection operations, as well as other operations described elsewhere herein as being performed by the base station 110a FIG. 2 shows a component block diagram illustrating an example processing system. The processing system may be implemented on a number of single processor, multiprocessor, and multicore processor systems, including a system-on-chip (SOC) or system in a package (SIP) 200.

With reference to FIGS. 1 and 2, the SIP 200 includes a two SOCs 202, 204, a clock 206, a voltage regulator 208, and a wireless transceiver 266. In some implementations, the first SOC 202 may operate as a central processing unit (CPU) of the wireless device that carries out the instructions of software application programs by performing the arithmetic, logical, control and input/output (I/O) operations specified by the instructions. In some implementations, the second SOC 204 may operate as a specialized processing unit. For example, the second SOC 204 may operate as a specialized 5G processing unit responsible for managing high volume, high speed (such as 5 Gbps, etc.), or very high frequency short wave length (such as 28 GHz mmWave spectrum, etc.) communications.

The first SOC 202 may include a digital signal processor (DSP) 210, a modem processor 212, a graphics processor 214, an application processor 216, one or more coprocessors 218 (such as vector co-processor) connected to one or more of the processors, memory 220, custom circuity 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of wireless transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (such as FreeBSD, LINUX, OS X, etc.) and a processor that executes a second type of operating system (such as MICROSOFT WINDOWS 10). In addition, any or all of the processors 210, 212, 214, 216, 218, 252, 260 may be included as part of a processor cluster architecture (such as a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 or custom circuitry 222 also may include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the wireless transceivers 256, memory 258, and various additional processors 260 via the interconnection/bus module 264. The interconnection/bus module 226, 250, 264 may include an array of reconfigurable logic gates or implement a bus architecture (such as CoreConnect, AMBA, etc.). Communications may be provided by advanced interconnects, such as high-performance networks-on chip (NoCs).

The first or second SOCs 202, 204 may further include an input/output module (not illustrated) for communicating with resources external to the SOC, such as a clock 206 and a voltage regulator 208. Resources external to the SOC (such as clock 206, voltage regulator 208) may be shared by two or more of the internal SOC processors/cores.

In addition to the example SIP 200 discussed above, various implementations may be implemented in a wide variety of processing systems, which may include a single processor, multiple processors, multicore processors, or any combination thereof.

Figure 3:
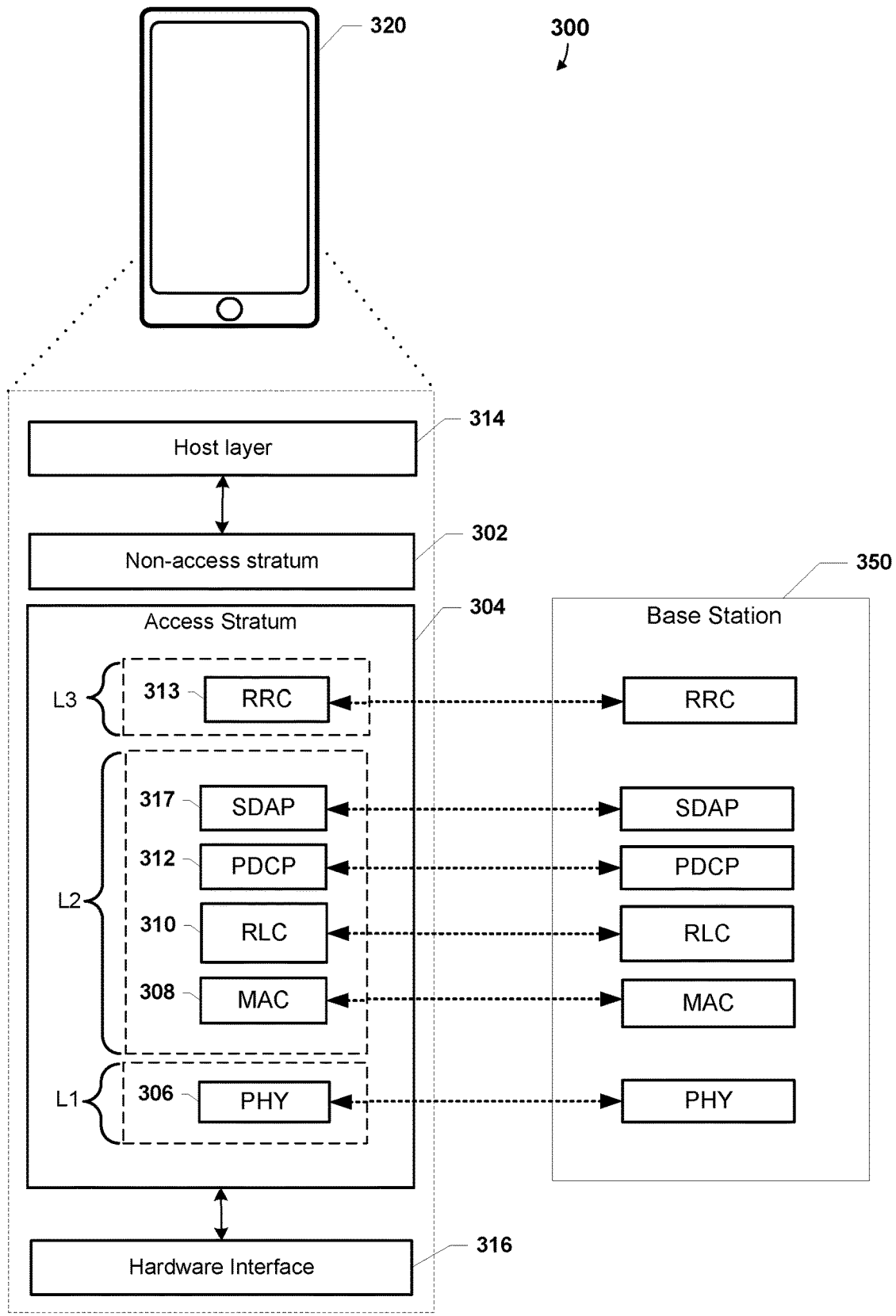
FIG. 3 shows a component block diagram of an example of a software architecture including a radio protocol stack for the user and control planes in wireless communications.

FIG. 3 shows a component block diagram of an example of a software architecture 300 including a radio protocol stack for the user and control planes in wireless communications. The wireless communications may be between a base station 350 (such as the base station 110a) and a wireless device 320 (such as the wireless device 120a-120e, 200). With reference to FIGS. 1-3, the wireless device 320 may implement the software architecture 300 to communicate with the base station 350 of a communication system (such as 100). In various implementations, layers in software architecture 300 may form logical connections with corresponding layers in software of the base station 350. The software architecture 300 may be distributed among one or more processor systems (such as the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (such as two protocol stacks associated with two SIMs, respectively, in a dual-SIM wireless communication device). While described below with reference to specific 5G-NR communication layers, the software architecture 300 may support any of variety of standards and protocols for wireless communications, or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (such as SIM(s) 204) and its core network 140. The AS 304 may include functions and protocols that support communication between a SIM(s) (such as SIM(s) 204) and entities of supported access networks (such as a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In the various implementations, Layer 2 may include a media access control (MAC) sublayer 308, a radio link control (RLC) sublayer 310, a packet data convergence protocol (PDCP) 312 sublayer, and a Service Data Adaptation Protocol (SDAP) 317 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various implementations, the RRC sublayer 313 may provide functions including broadcasting system information, paging, and establishing and releasing an RRC signaling connection between the wireless device 320 and the base station 350.

In some implementations, the SDAP sublayer 317 may provide mapping between Quality of Service (QoS) flows and data radio bearers (DRBs). In the downlink, at the base station 350, the SDAP sublayer 317 may provide mapping for DL QoS flows to DRBs. In the uplink, at the wireless device 320, the SDAP sublayer 317 may deliver DL received QoS flows to upper layers. In some implementations, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some implementations, application-specific functions provided by the at least one host layer 314 may provide an interface between the software architecture and the general purpose processor 206.

In some implementations, the software architecture 300 may include one or more higher logical layer (such as transport, session, presentation, application, etc.) that provide host layer functions. For example, in some implementations, the software architecture 300 may include a network layer (such as IP layer) in which a logical connection terminates at an access and mobility factor (AMF) or a packet data network (PDN) gateway (PGW). In some implementations, the software architecture 300 may include an application layer in which a logical connection terminates at another device (such as end user device, server, etc.). In some implementations, the software architecture 300 may further include in the AS 304 a hardware interface 316 between the physical layer 306 and the communication hardware (such as one or more radio frequency (RF) transceivers).

Figure 4:
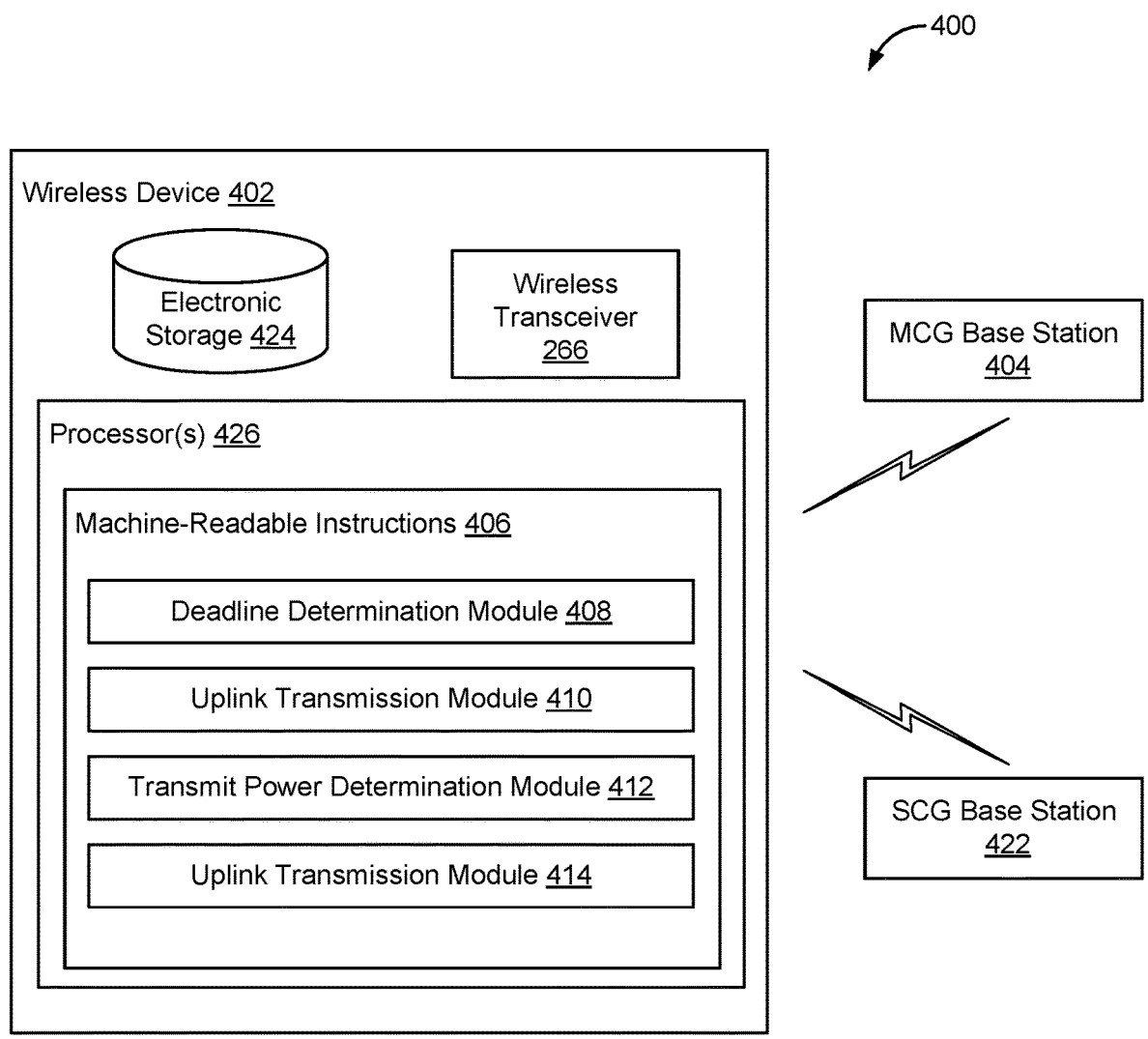
FIG. 4 shows a component block diagram of an example wireless communication system configured for determining a transmit power of an uplink transmission to one or more serving cells in a secondary cell group (SCG).

FIG. 4 shows a component block diagram of an example a wireless communication system 400 configured for determining a transmit power of an uplink transmission to one or more serving cells in a SCG. In some implementations, the wireless communication system 400 may include one or more wireless devices 402 in wireless communications with one or more base stations functioning as an MCG base station 404 and one or more base stations functioning as an SCG base station 422. With reference to FIGS. 1-4, the wireless device 402 may be similar to wireless devices 120a-120e, 200, 320 described herein.

The wireless device 402 may include an apparatus that includes one or more processors 426 coupled to one or more wireless transceivers (such as wireless transceiver 266) and to electronic storage 424, such as volatile and non-volatile memory. The one or more processors 426 may be configured by machine-readable instructions 406, which may be stored in electronic storage 424 before execution. Machine-readable instructions 406 may include one or more instruction modules. The instruction modules may include computer program modules. The instruction modules may include one or more of a deadline determination module 408, an uplink transmission module 410, a transmit power determination module 412, an uplink transmission module 414, as well as other instruction modules.

The deadline determination module 408 may be configured to determine a deadline prior to the uplink transmission to the one or more serving cells in the SCG. The deadline may be determined in response to receiving a DCI format for the one or more serving cells in the SCG scheduling the uplink transmission to the one or more serving cells in the SCG and based on a scheduled start of the uplink transmission to the one or more serving cells in the SCG minus an offset period. The deadline determination module 408 may be configured to determine the offset period. In some implementations, the offset period may be determined based on one or more capabilities of a wireless device.

Uplink transmission module 410 may be configured to determine whether to perform a semi-static uplink transmission that is not scheduled by a DCI format to a serving cell in an MCG. The uplink transmission module 410 may be configured to determine whether the wireless device is permitted to skip the semi-static uplink transmission to the serving cell in the MCG according to a wireless device parameter received from a base station.

The transmit power determination module 412 may be configured to adjust a transmit power of the uplink transmission to the one or more serving cells in the SCG in response to determining to perform the semi-static uplink transmission to the serving cell in the MCG. The transmit power determination module 412 may be configured to reduce the transmit power of the one or more scheduled uplink transmissions to the one or more serving cells in the SCG such that a combined transmit power of the semi-static uplink transmission to the serving cell in the MCG and the one or more scheduled uplink transmissions to the one or more serving cells in the SCG is less than or equal to a maximum permitted transmit power of the wireless device. The transmit power determination module 412 may be configured to use an unadjusted transmit power of the uplink transmission to the one or more serving cells in the SCG in response to determining to not perform the semi-static uplink transmission to the serving cell in the MCG.

The uplink transmission transmittal module 414 may be configured to transmit the uplink transmission to the one or more serving cells in the SCG using an unadjusted transmit power in response to determining to not perform the semi-static uplink transmission to the serving cell in the MCG. The uplink transmission transmittal module 414 may be configured to transmit the uplink transmission to the one or more serving cells in the SCG using the adjusted or unadjusted transmit power.

Figure 5A:
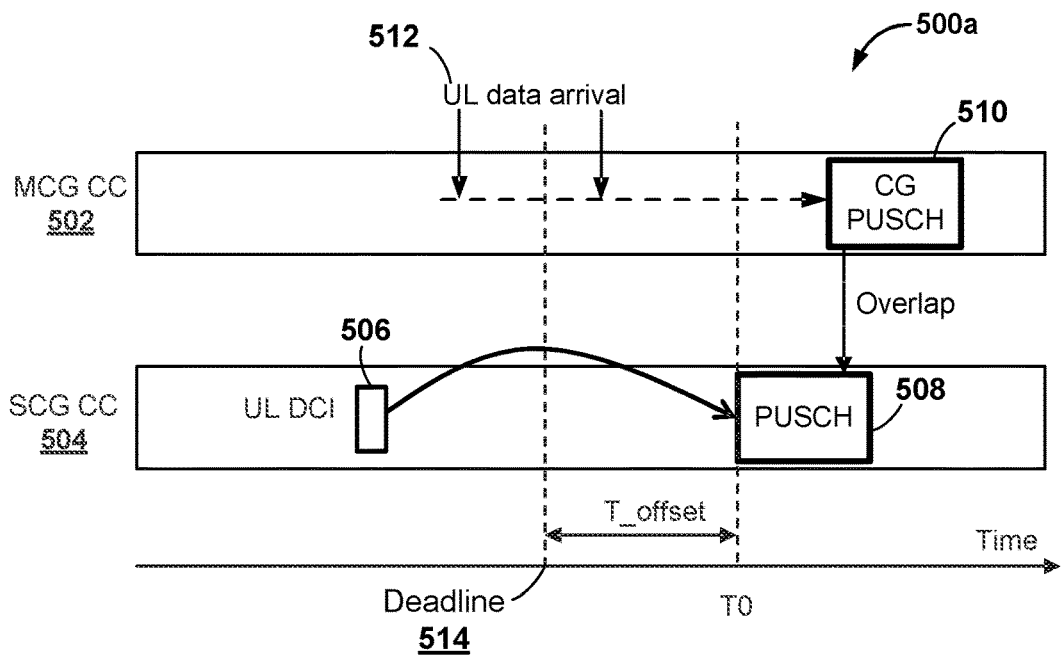
FIGS. 5A and 5B show timeline diagrams of example master cell group (MCG) uplink transmissions are not scheduled by a downlink control information (DCI) format.
Figure 5B:
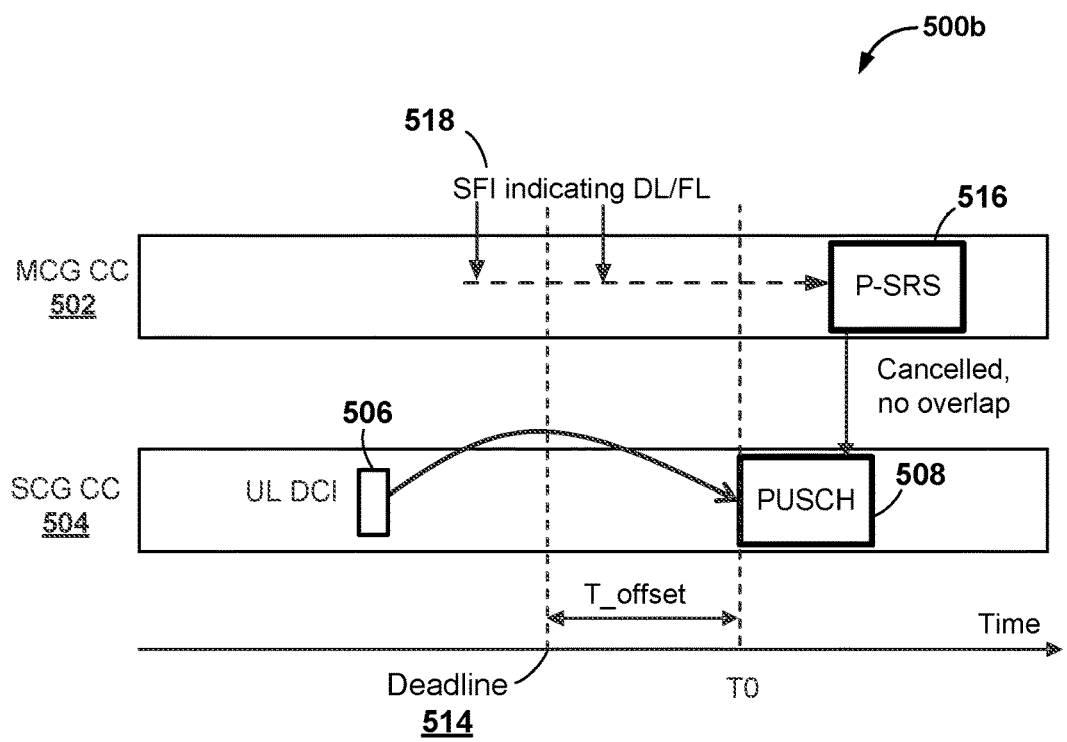

FIGS. 5A and 5B show timeline diagrams 500a, 500b of example MCG uplink transmissions are not scheduled by a DCI format. The timeline diagram 500a in FIG. 5A shows an example MCG component carrier (CC) 502 uplink transmission that is not scheduled by a DCI format, CG PUSCH 510. A wireless device is not required to transmit a scheduling request and receive an uplink resource grant from a cell in order to transmit the CG PUSCH 510. As illustrated in FIG. 5A, the CG PUSCH 510 may overlap in time with a scheduled PUSCH transmission 508 in SCG CC 504. The PUSCH transmission 508 may be scheduled in response to an uplink DCI (UL DCI) 506.

The CG PUSCH 510 may be triggered by the arrival of UL data 512, which may arrive before or after a deadline 514. An apparatus (such as a processing system) of the wireless device may determine the deadline 514 prior to the scheduled PUSCH transmission 508. For example, the wireless device may determine the deadline based on the scheduled beginning of the scheduled PUSCH transmission 508 (illustrated as T0) minus an offset time period (illustrated as T_offset). In some implementations, the deadline 514 may be represented as T0−T_offset. In some implementations, the wireless device may be configured to independently determine whether or not to send the CG PUSCH 510 (for example, by a MAC parameter such as skipUplinkTxDynamic).

The timeline diagram 500b in FIG. 5B shows an example periodic sounding reference signal P-SRS 516, which is one example of a periodic or semi-persistent uplink transmission. In some implementations, the P-SRS 516 may be canceled by a slot format indication SFI 518 that indicates a downlink slot (DL) or a flexible (FL) slot that overlaps in time with the scheduled SCG uplink transmission 508. In some implementations, the wireless device may determine that the P-SRS 516 has been canceled by the SFI 518, which may arrive before or after a deadline 514. In some implementations, the wireless device may determine whether the wireless device is permitted to skip sending the P-SRS 516 according to a wireless device parameter received from a base station.

Figure 6:
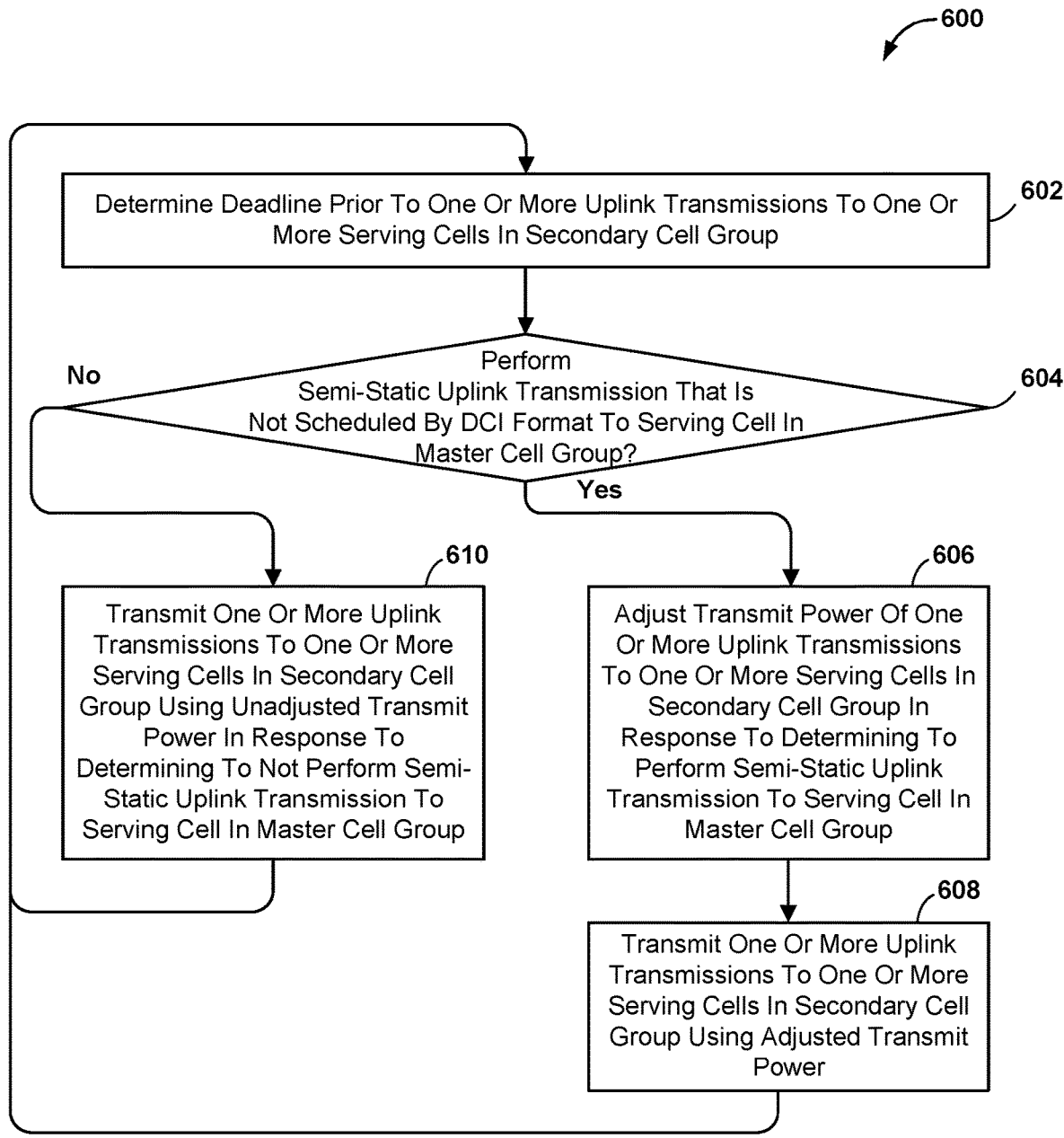
FIG. 6 shows a process flow diagram of an example method for determining a transmit power of an uplink transmission to one or more serving cells in a SCG by an apparatus of a wireless device.

FIG. 6 shows a process flow diagram of an example method 600 for determining a transmit power of an uplink transmission to one or more serving cells in a SCG by an apparatus of a wireless device. With reference to FIGS. 1-6, the operations of the method 600 may be performed by an apparatus including a processing system (such as the SIP 200 and processors 202, 204, 426) of a wireless device (such as the wireless device 120a-120e, 200, 320, 402).

In block 602, the apparatus including a processing system may determine a deadline prior to the uplink transmission to the one or more serving cells in the SCG. In some implementations, the apparatus may determine the deadline based on the scheduled beginning of an uplink transmission to the one or more serving cells in the SCG, minus an offset time period. In some implementations, the apparatus may determine the deadline in response to receiving a DCI format for the one or more serving cells in the SCG scheduling the uplink transmission to the one or more serving cells in the SCG and based on a scheduled start of the uplink transmission to the one or more serving cells in the SCG minus an offset period. Means for performing functions of block 602 may include an apparatus including processing system components such as an SIP 200 and processors 202, 204, 426.

In determination block 604, the apparatus may determine whether to perform a semi-static uplink transmission that is not scheduled by a DCI format to a serving cell in an MCG. In some implementations, the wireless device may determine whether to skip a CG transmission (or other similar transmission) to serving cell in the MCG. In some implementations, the wireless device may determine whether the wireless device is permitted to skip the semi-static uplink transmission to the serving cell in the MCG according to a wireless device parameter received from a base station. Means for performing functions of determination block 604 may include an apparatus including processing system components such as an SIP 200 and processors 202, 204, 426.

In response to determining to perform the semi-static uplink transmission that is not scheduled by a DCI format (i.e., determination block 604="Yes"), the apparatus may adjust a transmit power of the uplink transmission to the one or more serving cells in the SCG in response to determining to perform the semi-static uplink transmission to the serving cell in the MCG in block 606. Means for performing functions of block 606 may include an apparatus including processing system components such as an SIP 200 and processors 202, 204, 426 coupled to a wireless transceiver 266.

In block 608, the apparatus may transmit the uplink transmission to the one or more serving cells in the SCG using the adjusted transmit power. Means for performing functions of block 608 may include an apparatus including processing system components such as an SIP 200 and processors 202, 204, 426 coupled to a wireless transceiver 266.

In response to determining to not perform the semi-static uplink transmission that is not scheduled by a DCI format (i.e., determination block 604="No"), the apparatus may perform operations including further including transmitting the uplink transmission to the one or more serving cells in the SCG using an unadjusted transmit power in response to determining to not perform the semi-static uplink transmission to the serving cell in the MCG in block 610. Means for performing functions of block 610 may include an apparatus including processing system components such as an SIP 200 and processors 202, 204, 426 coupled to a wireless transceiver 266.

Following the operations of blocks 608 or 610, in some implementations, the apparatus may again perform the operations of blocks 602-610 as described.

Figure 7A:
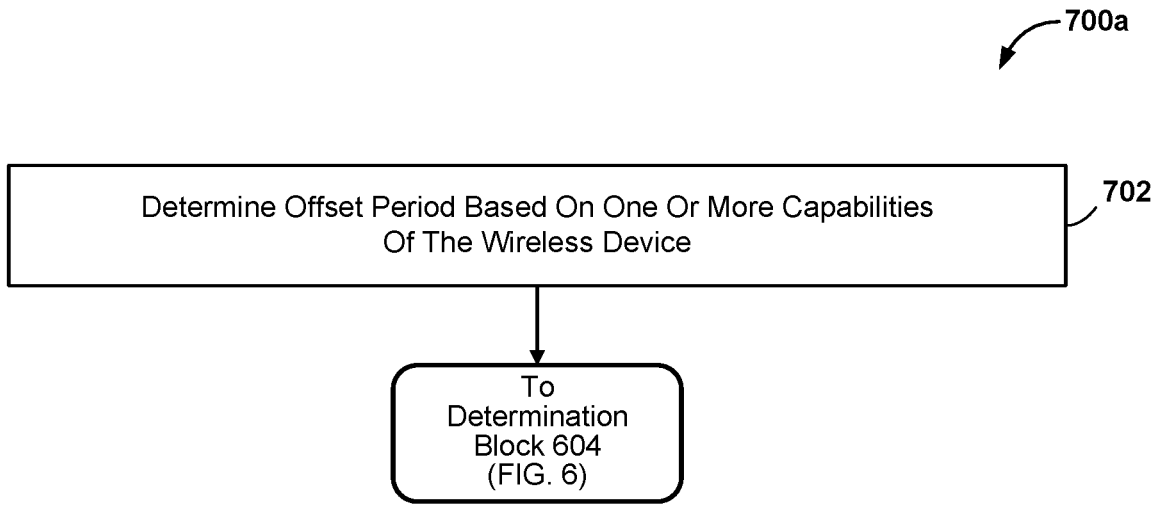
FIGS. 7A-7C show process flow diagrams of example operations that may be performed as part of the method for determining a transmit power of an uplink transmission to one or more serving cells in a SCG.
Figure 7B:
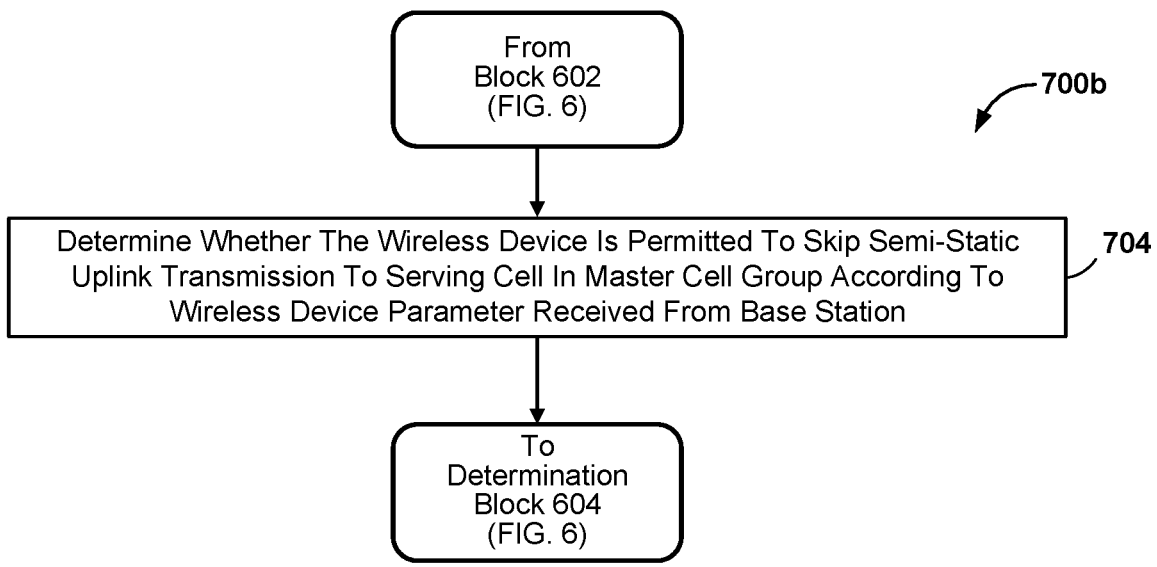
Figure 7C:
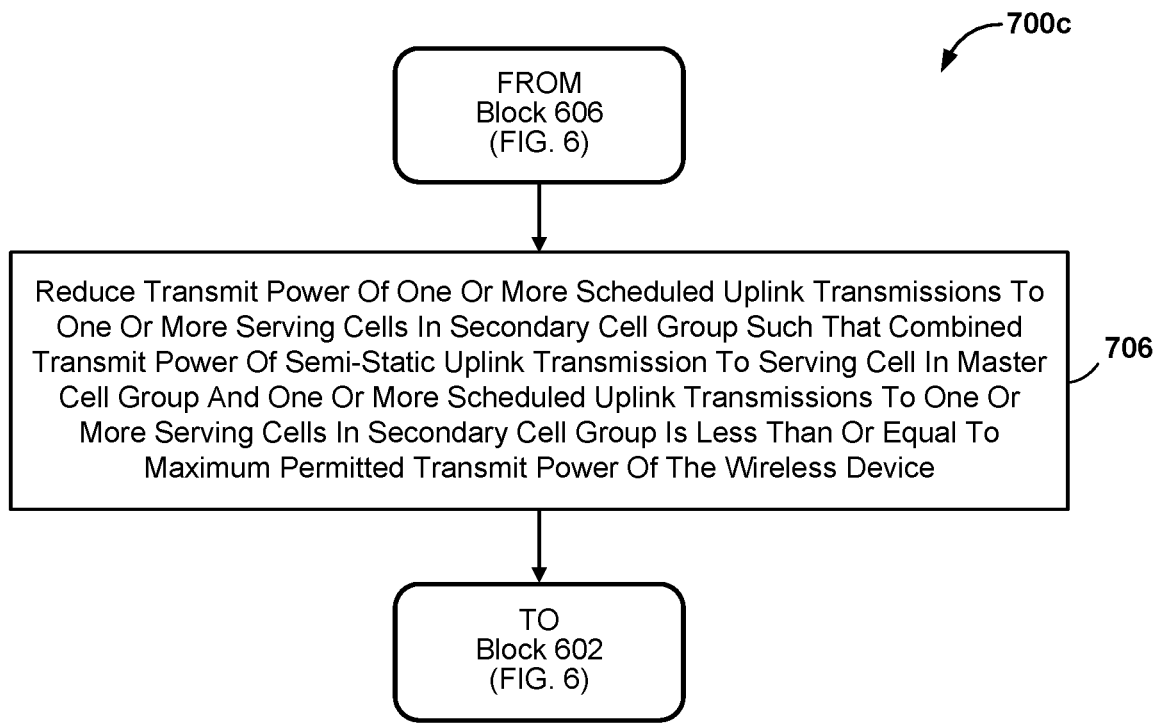

FIGS. 7A-7C show process flow diagrams of example operations 700a-700c that may be performed as part of the method 600 for determining a transmit power of an uplink transmission to one or more serving cells in a SCG. With reference to FIG. 1-7C, the operations may be performed by an apparatus including a processing system (such as the SIP 200 or processors 202, 204, 426) of a wireless device (such as the wireless device 120a-120e, 200, 320, 402).

Referring to FIG. 7A, the apparatus may determine the offset period in block 702. In some implementations, the processor may determine the offset. Based on one or more capabilities of the wireless device. For example, a wireless device configured with fast processing resources (such as a fast processor, fast cache memory, a high-bandwidth data transmission bus, and the like) may require less time to determine an adjusted secondary cell transmit power, and may determine a relatively shorter offset period based on the capabilities of the wireless device. As another example, a wireless device with slower processing resources may require more time to determine an adjusted secondary cell transmit power, and may determine the offset period accordingly.

The apparatus may then perform the operations of determination block 604 (FIG. 6).

Referring to FIG. 7B, following the operations of block 602 (FIG. 6), the apparatus may determine whether the wireless device is permitted to skip the semi-static uplink transmission to the serving cell in the MCG according to a wireless device parameter received from a base station in block 704. For example, in some implementations, the wireless device may be configured to independently determine whether or not to send a CG PUSCH transmission (for example, by a MAC parameter such as skipUplinkTxDynamic or another suitable wireless device parameter.

The apparatus may then perform the operations of determination block 604 (FIG. 6).

Referring to FIG. 7C, following the operations of block 606 (FIG. 6), the apparatus may reduce the transmit power of the one or more scheduled uplink transmissions to the one or more serving cells in the SCG such that a combined transmit power of the semi-static uplink transmission to the serving cell in the MCG and the one or more scheduled uplink transmissions to the one or more serving cells in the SCG is less than or equal to a maximum permitted transmit power of the wireless device in block 706.

The apparatus may then perform the operations of block 602 (FIG. 6).

Figure 8:
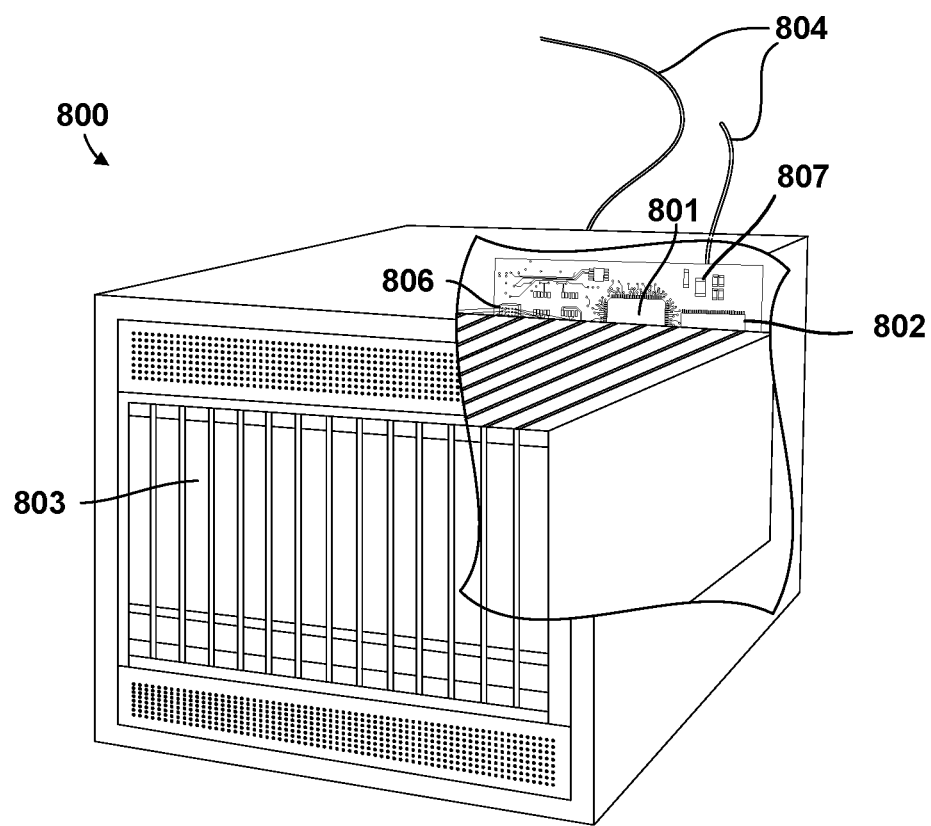
FIG. 8 shows a component block diagram of an example network computing device.

FIG. 8 shows a component block diagram of an example network computing device 800. With reference to FIGS. 1-8, the network computing device 800 may function as a network element of a communication network, such as a base station. The network computing device 800 may include a processor 801 coupled to volatile memory 802 and a large capacity nonvolatile memory, such as a disk drive 803. The network computing device 800 also may include a peripheral memory access device such as a floppy disc drive, compact disc (CD) or digital video disc (DVD) drive 806 coupled to the processor 801. The network computing device 800 also may include network access ports 804 (or interfaces) coupled to the processor 801 for establishing data connections with a network, such as the Internet or a local area network coupled to other system computers and servers. The network computing device 800 may include one or more antennas 807 for sending and receiving electromagnetic radiation that may be connected to a wireless communication link. The network computing device 800 may include additional access ports, such as USB, Firewire, Thunderbolt, and the like for coupling to peripherals, external memory, or other devices.

Figure 9:
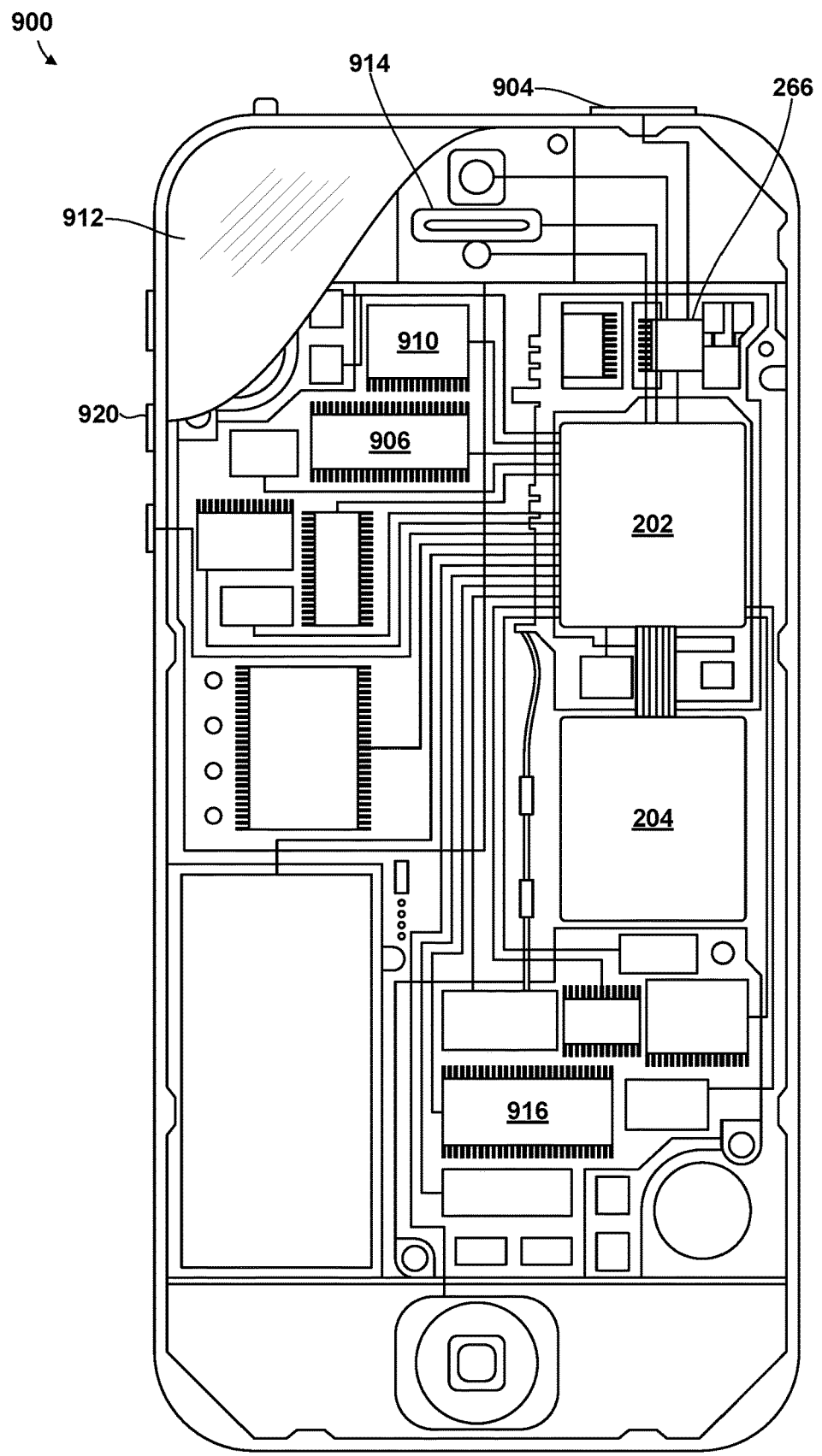
FIG. 9 shows a component block diagram of an example wireless device.

FIG. 9 shows a component block diagram of an example wireless device (such as the wireless device 120a-120e, 200, 320, 402). In some implementations, the wireless device may be implemented in the form of a smartphone 900. The smartphone 900 may include an apparatus configured to perform methods of various implementation, that may include a first SOC 202 (such as a SOC-CPU) coupled to a second SOC 204 (such as a 5G capable SOC). The first and second SOCs 202, 204 may be coupled to internal memory 906, 916, a display 912, and to a speaker 914. Additionally, the smartphone 900 may include an antenna 904 for sending and receiving electromagnetic radiation that may be connected to a wireless data link or cellular telephone transceiver 266 coupled to one or more processors in the first or second SOCs 202, 204. Smartphones 900 typically also include menu selection buttons or rocker switches 920 for receiving user inputs.

The smartphone 900 also may include a sound encoding/decoding (CODEC) circuit 910, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 910 may include a digital signal processor (DSP) circuit (not shown separately).

The processors of the wireless network computing device 800 and the smart phone 900 may be any programmable microprocessor, microcomputer or multiple processor chip or chips that can be configured by software instructions (applications) to perform a variety of functions, including the functions of the various implementations described below. In some wireless devices, multiple processors may be provided, such as one processor within an SOC 204 dedicated to wireless communication functions and one processor within an SOC 202 dedicated to running other applications. Typically, software applications may be stored in the memory 906, 916 before they are accessed and loaded into the processor. The processors may include internal memory sufficient to store the application software instructions.

Implementation examples are described in the following paragraphs. While some of the following implementation examples are described in terms of example methods, further example implementations may include: the example methods discussed in the following paragraphs implemented by a wireless device including a processor configured with processor-executable instructions to perform operations of the methods of the following implementation examples; the example methods discussed in the following paragraphs implemented by a wireless device including means for performing functions of the methods of the following implementation examples; and the example methods discussed in the following paragraphs may be implemented as a non-transitory processor-readable storage medium having stored thereon processor-executable instructions configured to cause a processor of a wireless device to perform the operations of the methods of the following implementation examples.

Example 1. A method performed by an apparatus of a wireless device, including: determining a deadline prior to an uplink transmission to one or more serving cells in a secondary cell group (SCG); determining whether to perform a semi-static uplink transmission that is not scheduled by a downlink control information (DCI) format to a serving cell in a master cell group (MCG); and adjusting a transmit power of the uplink transmission to the one or more serving cells in the SCG in response to determining to perform the semi-static uplink transmission to the serving cell in the MCG.

Example 2. The method of claim 1, further including transmitting the uplink transmission to the one or more serving cells in the SCG using an unadjusted transmit power in response to determining to not perform the semi-static uplink transmission to the serving cell in the MCG.

Example 3. The method of any of claims 1-2, further including transmitting the uplink transmission to the one or more serving cells in the SCG using the adjusted transmit power.

Example 4. The method of any of claims 1-3, where determining the deadline prior to the uplink transmission to the one or more serving cells in the SCG is performed in response to receiving a DCI format for the one or more serving cells in the SCG scheduling the uplink transmission to the one or more serving cells in the SCG and based on a scheduled start of the uplink transmission to the one or more serving cells in the SCG minus an offset period.

Example 5. The method of claim 4, further including determining the offset period.

Example 6. The method of claim 5, where the offset period is determined based on one or more capabilities of the wireless device.

Example 7. The method of any of claims 1-6, further including determining whether the wireless device is permitted to skip the semi-static uplink transmission to the serving cell in the MCG according to a wireless device parameter received from a base station.

Example 8. The method of any of claims 1-7, where adjusting the transmit power of the uplink transmission to the one or more serving cells in the SCG includes reducing the transmit power of the uplink transmission to the one or more serving cells in the SCG such that a combined transmit power of the semi-static uplink transmission to the serving cell in the MCG and the uplink transmission to the one or more serving cells in the SCG is less than or equal to a maximum permitted transmit power of the wireless device.

As used in this application, the term is "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on an apparatus (such as including a processing system, an object, an executable, a thread of execution, a program, or a computer. By way of illustration, both an application running on a wireless device and the wireless device may be referred to as a component. One or more components may reside within a process or thread of execution and a component may be localized on one processor or core or distributed between two or more processors, cores or processing systems. In addition, these components may execute from various non-transitory computer readable media having various instructions or data structures stored thereon. Components may communicate by way of local or remote processes, function or procedure calls, electronic signals, data packets, memory read/writes, and other known network, computer, processing system, or process related communication methodologies.

A number of different cellular and mobile communication services and standards are available or contemplated in the future, all of which may implement and benefit from the various implementations. Such services and standards include, such as third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (such as cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, or content messages. It should be understood that any references to terminology or technical details related to an individual telecommunication standard or technology are for illustrative purposes only, and are not intended to limit the scope of the claims to a particular communication system or technology unless specifically recited in the claim language.

Various implementations illustrated and described are provided merely as examples to illustrate various features of the claims. However, features shown and described with respect to any given implementation are not necessarily limited to the associated implementation and may be used or combined with other implementations that are shown and described. Further, the claims are not intended to be limited by any one example implementation. For example, one or more of the operations of the methods disclosed herein may be substituted for or combined with one or more operations of the methods disclosed herein.

As used herein, a phrase referring to "at least one of" a list of items refers to any combination of those items, including single members. As an example, "at least one of: a, b, or c" is intended to cover: a, b, c, a-b, a-c, b-c, and a-b-c.

Various illustrative logics, logical blocks, modules, components, circuits, and algorithm operations described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented as hardware or software depends upon the particular application and design constraints imposed on the overall system.

The hardware and data processing apparatus (which may include a processing system) used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. An apparatus also may be implemented as a combination, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a non-transitory processor-readable medium. The processes of a method or algorithm disclosed herein may be implemented in a processor-executable software module which may reside on a non-transitory processor-readable medium. Processor-readable media includes both computer storage media and communication media including any medium that can be enabled to transfer a computer program from one place to another. A non-transitory storage media may be any available media that may be accessed by a processor of a processing system. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a processor of a processing system. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method performed by an apparatus of a wireless device, comprising:
   receiving a parameter from a base station enabling the wireless device to skip a semi-static uplink transmission that is not scheduled by a downlink control information (DCI) format to the serving cell in a master cell group (MCG); and
   in response to receiving the parameter, sending a semi-static uplink transmission to one or more serving cells in a secondary cell group (SCG) with an adjusted transmit power if the semi-static uplink transmission to the one or more serving cells in the SCG will overlap in time with the semi-static uplink transmission to the serving cell in the MCG.

2. The method of claim 1, further comprising transmitting the semi-static uplink transmission to the one or more serving cells in the SCG without adjusting the transmit power in response to skipping the semi-static uplink transmission to the serving cell in the MCG.

3. The method of claim 1, further comprising:
   determining a deadline prior to the semi-static uplink transmission to the one or more serving cells in the SCG; and
   determining after the deadline to perform the semi-static uplink transmission to the serving cell in the MCG.

4. The method of claim 3, wherein determining the deadline prior to the semi-static uplink transmission to the one or more serving cells in the SCG further comprises determining the deadline based on a scheduled start of the semi-static uplink transmission to the one or more serving cells in the SCG minus an offset period.

5. The method of claim 4, wherein the offset period is determined based on one or more capabilities of the wireless device.

6. The method of claim 1, wherein sending a semi-static uplink transmission to the one or more serving cells in an SCG with an adjusted transmit power comprises reducing the transmit power of the uplink transmission to the one or more serving cells in the SCG such that a combined transmit power of the semi-static uplink transmission to the serving cell in the MCG and the uplink transmission to the one or more serving cells in the SCG is less than or equal to a maximum permitted transmit power of the wireless device.

7. An apparatus of a wireless device, comprising:
   a wireless transceiver; and
   a processing system coupled to the wireless transceiver and configured to:
      receive a parameter from a base station enabling the wireless device to skip a semi-static uplink transmission that is not scheduled by a downlink control information (DCI) format to the serving cell in a master cell group (MCG); and
      in response to receiving the parameter, send a semi-static uplink transmission to one or more serving cells in a secondary cell group (SCG) with an adjusted transmit power if the semi-static uplink transmission to the one or more serving cells in the SCG will overlap in time with the semi-static uplink transmission to the serving cell in the MCG.

8. The apparatus of claim 7, wherein the processing system is further configured to transmit the semi-static uplink transmission to the one or more serving cells in the SCG without adjusting the transmit power in response to skipping the semi-static uplink transmission to the serving cell in the MCG.

9. The apparatus of claim 7, wherein the processing system is further configured to:
   determine a deadline prior to the semi-static uplink transmission to the one or more serving cells in the SCG; and
   determine after the deadline to perform the semi-static uplink transmission to the serving cell in the MCG.

10. The apparatus of claim 9, wherein the processing system is further configured to determine the deadline based on a scheduled start of the semi-static uplink transmission to the one or more serving cells in the SCG minus an offset period.

11. The apparatus of claim 10, wherein the processing system is further configured to determine the offset period based on one or more capabilities of the wireless device.

12. The apparatus of claim 7, wherein the processing system is further configured to send a semi-static uplink transmission to the one or more serving cells in a secondary cell group (SCG) with an adjusted transmit power by reducing the transmit power to the one or more serving cells in the SCG such that a combined transmit power of the semi-static uplink transmission to the serving cell in the MCG and the uplink transmission to the one or more serving cells in the SCG is less than or equal to a maximum permitted transmit power of the wireless device.

13. A non-transitory processor-readable medium having stored thereon processor-executable instructions configured to cause a processing system of a wireless device to perform operations comprising:
- receiving a parameter from a base station enabling the wireless device to skip a semi-static uplink transmission that is not scheduled by a downlink control information (DCI) format to the serving cell in a master cell group (MCG); and
- in response to receiving the parameter, sending a semi-static uplink transmission to one or more serving cells in a secondary cell group (SCG) with an adjusted transmit power if the semi-static uplink transmission to the one or more serving cells in the SCG will overlap in time with the semi-static uplink transmission to the serving cell in the MCG.

14. The non-transitory processor-readable medium of claim 13, wherein the stored processor-executable instructions are configured to cause a processing system of a wireless device to perform operations further comprising transmitting the semi-static uplink transmission to the one or more serving cells in the SCG without adjusting the transmit power in response to skipping the semi-static uplink transmission to the serving cell in the MCG.

15. The non-transitory processor-readable medium of claim 13, wherein the stored processor-executable instructions are configured to cause a processing system of a wireless device to perform operations further comprising:
- determining a deadline prior to the semi-static uplink transmission to the one or more serving cells in the SCG; and
- determining after the deadline to perform the semi-static uplink transmission to the serving cell in the MCG.

16. The non-transitory processor-readable medium of claim 15, wherein the stored processor-executable instructions are configured to cause a processing system of a wireless device to perform operations such that determining the deadline prior to the semi-static uplink transmission to the one or more serving cells in the SCG comprises determining the deadline based on a scheduled start of the semi-static uplink transmission to the one or more serving cells in the SCG minus an offset period based on one or more capabilities of the wireless device.

17. The non-transitory processor-readable medium of claim 13, wherein the stored processor-executable instructions are configured to cause a processing system of a wireless device to perform operations such that sending a semi-static uplink transmission to the one or more serving cells in an SCG with an adjusted transmit power comprises reducing the transmit power to the one or more serving cells in the SCG such that a combined transmit power of the semi-static uplink transmission to the serving cell in the MCG and the uplink transmission to the one or more serving cells in the SCG is less than or equal to a maximum permitted transmit power of the wireless device.

18. A wireless device, comprising:
- means for receiving a parameter from a base station enabling the wireless device to skip a semi-static uplink transmission that is not scheduled by a downlink control information (DCI) format to the serving cell in a master cell group (MCG); and
- means for, in response to receiving the parameter, sending a semi-static uplink transmission to one or more serving cells in a secondary cell group (SCG) with an adjusted transmit power if the semi-static uplink transmission to the one or more serving cells in the SCG will overlap in time with the semi-static uplink transmission to the serving cell in the MCG.

19. The wireless device of claim 18, further comprising means for transmitting the semi-static uplink transmission to the one or more serving cells in the SCG without adjusting the transmit power in response to skipping the semi-static uplink transmission to the serving cell in the MCG.

20. The wireless device of claim 18, further comprising:
- means for determining a deadline prior to the semi-static uplink transmission to the one or more serving cells in the SCG; and
- means for determining after the deadline to perform the semi-static uplink transmission to the serving cell in the MCG.

21. The wireless device of claim 20, wherein means for determining a deadline prior to the semi-static uplink transmission to the one or more serving cells in the SCG comprises means for determining the deadline based on a scheduled start of the semi-static uplink transmission to the one or more serving cells in the SCG minus an offset period based on one or more capabilities of the wireless device.

22. The wireless device of claim 18, wherein means for sending a semi-static uplink transmission to the one or more serving cells in an SCG with an adjusted transmit power comprises means for reducing the transmit power to the one or more serving cells in the SCG such that a combined transmit power of the semi-static uplink transmission to the serving cell in the MCG and the uplink transmission to the one or more serving cells in the SCG is less than or equal to a maximum permitted transmit power of the wireless device.

* * * * *